(12) United States Patent
Riedmann et al.

(10) Patent No.: US 7,457,331 B2
(45) Date of Patent: Nov. 25, 2008

(54) OPTICAL ARRANGEMENT

(75) Inventors: Juergen Riedmann, Obersulm-Eschenau (DE); Volker Leimbach, Ludwigshafen (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 241 days.

(21) Appl. No.: 11/251,657

(22) Filed: Oct. 17, 2005

(65) Prior Publication Data

US 2006/0092998 A1 May 4, 2006

Related U.S. Application Data

(60) Provisional application No. 60/714,653, filed on Sep. 7, 2005.

(30) Foreign Application Priority Data

Oct. 29, 2004 (DE) .................. 10 2004 052 955

(51) Int. Cl.
*H01S 3/10* (2006.01)

(52) U.S. Cl. .......................... 372/25; 372/33
(58) Field of Classification Search .................. 372/25, 372/33
See application file for complete search history.

(56) References Cited

U.S. PATENT DOCUMENTS

| 4,950,889 | A | * | 8/1990 | Budd et al. ................ 250/236 |
| 5,862,287 | A | * | 1/1999 | Stock et al. ................ 385/123 |
| 6,178,041 | B1 | | 1/2001 | Simon et al. |
| 2005/0259701 | A1 | * | 11/2005 | Albert ........................ 372/30 |

FOREIGN PATENT DOCUMENTS

| DE | 19622359 | 12/1997 |
| DE | 19755361 | 6/1998 |

\* cited by examiner

*Primary Examiner*—Dung T Nguyen
(74) *Attorney, Agent, or Firm*—Darby & Darby

(57) ABSTRACT

An optical arrangement includes a laser, and a chromatic error correcting device arranged in a beam path of the laser. The chromatic error correcting device includes a pulse stretcher.

17 Claims, 2 Drawing Sheets

OPTICAL ARRANGEMENT

Priority is claimed to the provisional application entitled "Optical Arrangement," filed on Sep. 7, 2005, by Applicants, and to German patent application DE 10 2004 052 955.8, the entire subject matters of both of which are hereby incorporated by reference herein.

The present invention relates to an optical arrangement, especially to a scanning microscope, having a laser, preferably a short-pulse laser, and a device for correcting chromatic errors arranged in the beam path emitted by the laser.

BACKGROUND

Optical arrangements of the above-mentioned type are known from actual practice. For example, such optical arrangements are employed within the scope of confocal laser scanning microscopes, whose uses include multi-photon laser microscopy. The latter application involves the use of short-pulse lasers in whose beam path devices for correcting chromatic errors of predefinable components of the optical arrangement are positioned. Here, it is usually the case that each individual component or each individual optical system is color-corrected separately. This is quite demanding and translates into a substantial device size and into considerable costs for the production of such a microscope.

SUMMARY OF THE INVENTION

It is an object of the present invention to provide an optical arrangement having a laser and a device for correcting chromatic errors arranged in the beam path emitted by the laser, in which a reduction in the size is achieved with structurally simple means and at a relatively low cost.

The present invention provides an optical arrangement having a laser and a device for correcting chromatic errors arranged in the beam path emitted by the laser. According to the invention, the device for correcting chromatic errors has a pulse stretcher.

Such a pulse stretcher can be combined in a simple manner with components present in the optical arrangement and can even be arranged integrally, which ultimately leads to a reduction in the size of the optical arrangement or of the scanning microscope in which the optical arrangement is being used. Here, through the use of the pulse stretcher, in an advantageous manner, a component that was originally intended for a totally different purpose, namely, for the time-stretching of light pulses, is now employed for correcting chromatic errors.

Consequently, with the optical arrangement according to the invention, an optical arrangement is realized with which a reduction in the size is achieved with structurally simple means and at a lower cost.

In order to ensure an especially pronounced correcting effect, the pulse stretcher could be arranged in a non-collimated section of the beam path. In its original use, a pulse stretcher is normally positioned in a collimated beam so that it has as little effect on the projecting lens system as possible. Hence, the advantageous arrangement of the pulse stretcher in a non-collimated beam path departs completely from what has been common practice so far.

In another advantageously effective manner in terms of the correction of chromatic errors, the pulse stretcher could be arranged in the area of a beam expansion system of the optical arrangement. Normally, no collimated beam is present in this area, so that a high efficacy of the correction device is ensured.

In a manner that is structurally especially simple and particularly conducive to reducing the size of the optical arrangement, the pulse stretcher could even be integrated into a beam expansion system of the optical arrangement. Such an integration of the pulse stretcher into a component of the optical arrangement could also be realized with components of the optical arrangement other than the beam expansion system. In any case, a reduction in the size could be achieved. Moreover, in this manner, the optical design of the entire arrangement could be simplified while retaining the same output as in the non-integrated case and could thus be less expensive.

A beam expansion system or a beam expander, preferably for multi-photon microscopy, could have two positive achromates having different focal lengths. No collimated beam is present in the area between the two positive achromates. In this case, the pulse stretcher could be arranged between the two positive achromates in a structurally especially simple and effective way. Here, the color correction of the beam expansion system or of the beam expander is improved and the total length of the system comprising the beam expansion system or beam expander and the pulse stretcher is reduced. The dispersion defined by the material of the pulse stretcher has an influence on the correction of chromatic errors or color errors.

The optical arrangement could have two identical positive achromates, as a result of which the collimation of the beam could be set, for example, in order to correct the laser. The above-mentioned advantages are also present in this case.

In a structurally especially simple embodiment, the pulse stretcher could be made of glass. Here, an embodiment as a glass rod is advantageous, whereby a pulse stretcher prism could be created here.

In an embodiment, the laser employed in the optical arrangement could be a short-pulse laser, whereby a laser could be used here that can be tuned over a broad spectrum such as, for example, a titanium-sapphire laser.

In an advantageous manner, the optical arrangement could be used in a multi-photon laser microscope.

In the present invention, the pulse stretcher needed in multi-photon systems is used for color correction in lens systems or optical arrangements, preferably in conjunction with beam expansion systems or beam expanders. The use of a beam expander—especially when it is employed in the beam path of a short-pulse laser—generally leads to axial color errors in the specimen. The optical arrangement according to the invention makes it possible to largely eliminate such color errors.

The color correction of optical systems in the multi-photon beam path can be considerably simplified, particularly if beam expansion is present, when the pulse stretcher is integrated into the beam expansion system. In this way, the optical design of the system can be simplified while retaining the same output and can thus be less expensive.

BRIEF DESCRIPTION OF THE DRAWINGS

Various possibilities exist to configure and refine the teaching of the present invention in an advantageous manner. For this purpose, reference is made to the explanation below of preferred embodiments of the teaching according to the invention on the basis of the drawings. In conjunction with the explanation of preferred embodiments of the teaching according to the invention, generally preferred embodiments and refinements of the teaching will also be explained on the basis of the drawings. The drawings show the following.

DETAILED DESCRIPTION

Figure 1:
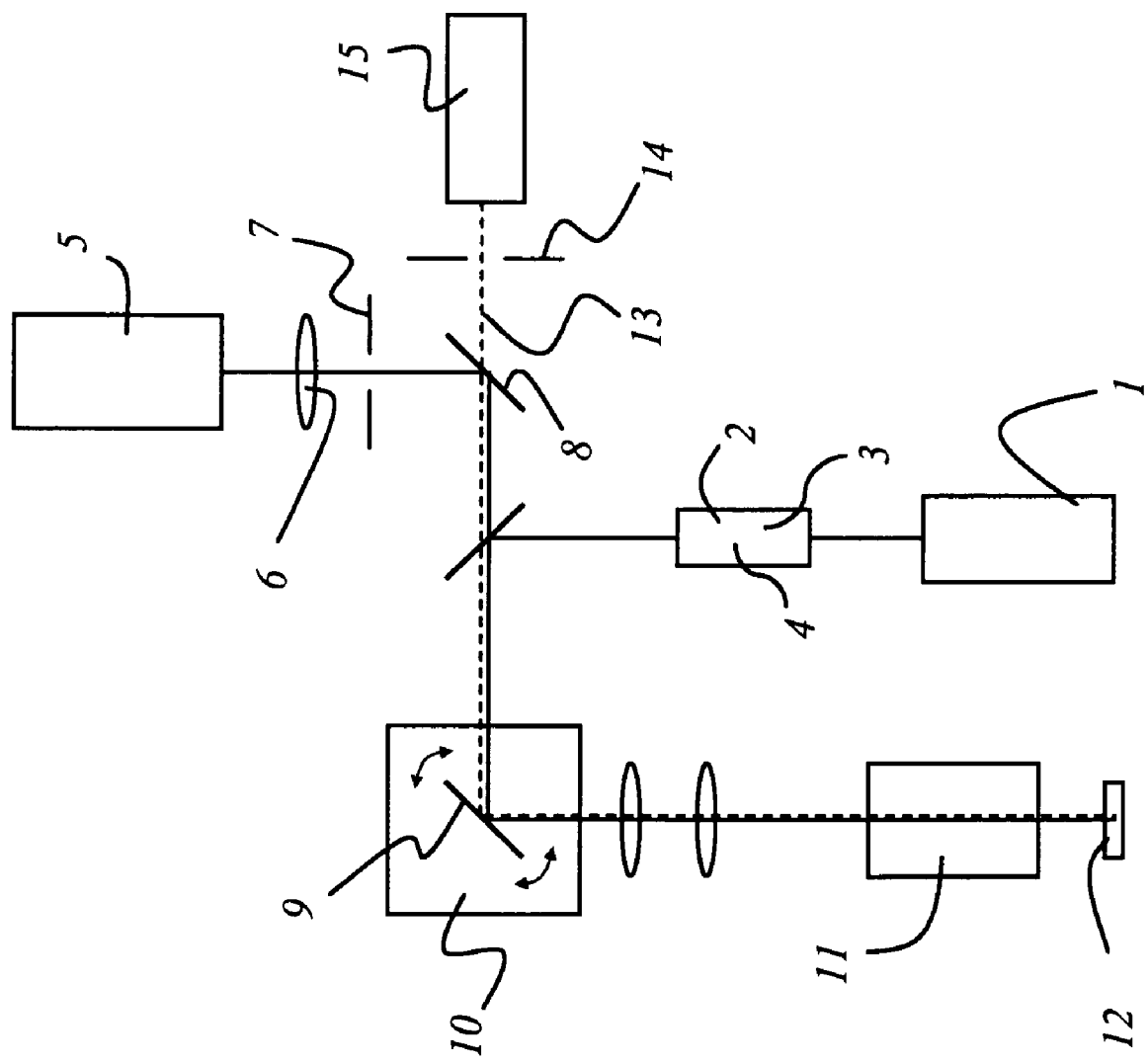
FIG. 1 a schematic depiction of a scanning microscope with an embodiment of an optical arrangement according to the invention.

FIG. 1 shows a schematic depiction of an optical arrangement that is configured as a scanning microscope, according to an embodiment of the present invention. The optical arrangement has a laser 1 that is configured as a short-pulse laser. A device 2 for correcting chromatic errors is arranged in the beam path emitted by the laser 1. With an eye towards reducing the size as well as the costs, the device 2 for correcting chromatic errors has a pulse stretcher 3.

The pulse stretcher 3 is integrated into a beam expansion system 4.

The optical arrangement also has another laser 5, a lens system 6 and a pinhole 7 for guiding the illumination light beam coming from the laser 5 onto a beam splitter 8. From the beam splitter 8, the illumination light beam is guided via a scanning mirror 9 of a scanning device 10 and via a lens system 11 onto a specimen 12. The light beam reflected from the specimen 12 is guided in the detection beam path 13 through a pinhole 14 to a detector 15.

Figure 2A:
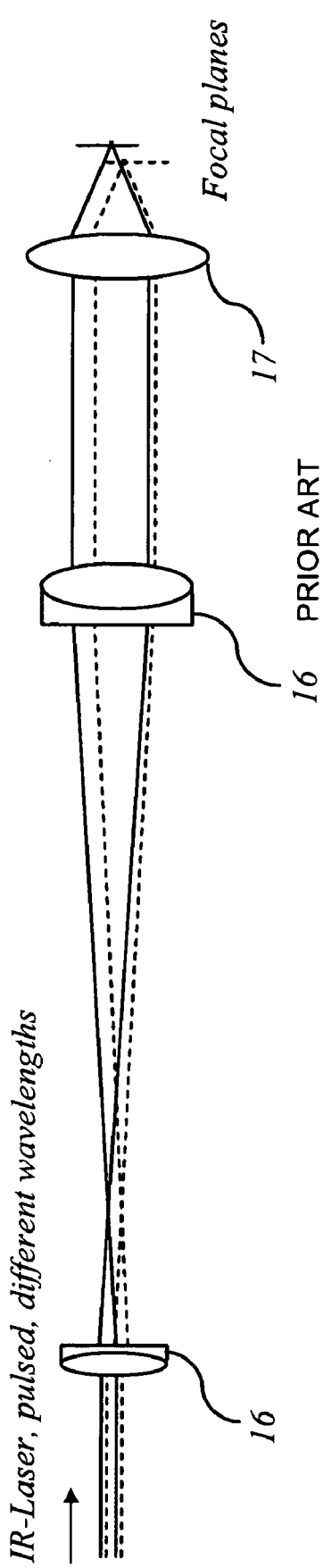
FIG. 2a a schematic depiction of a beam expansion system of a conventional type from the prior art.
Figure 2B:
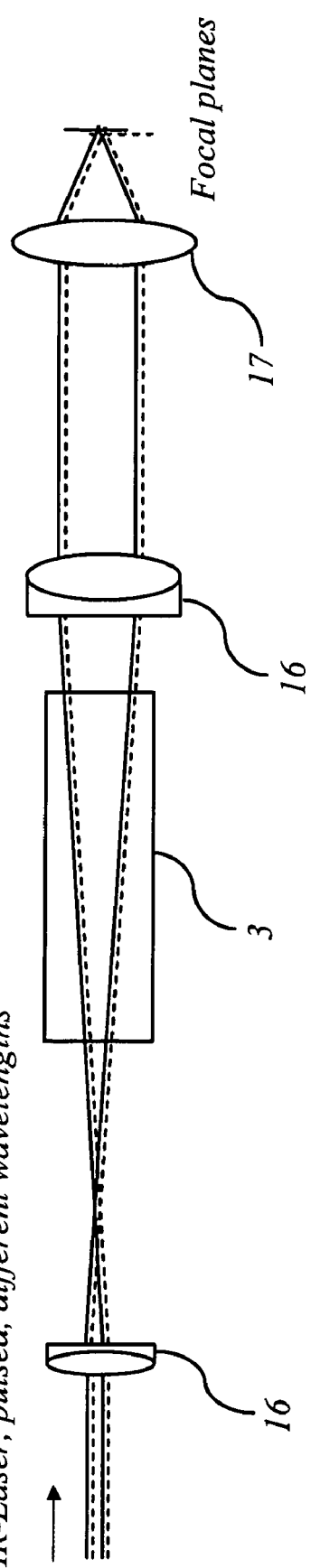
FIG. 2b a schematic depiction of the beam path in a beam expansion system with an integrated pulse stretcher.

FIGS. 2a and 2b each show a beam path in a beam expansion system 4 having two positive achromates 16 of different focal lengths. The beam expansion system 4 is followed by a lens 17 for projecting the light in focal planes. FIG. 2a shows a conventional arrangement, wherein the focal planes belonging to different wavelengths clearly differ from each other downstream from the beam expansion system 4.

In FIG. 2b, a pulse stretcher 3 for correcting chromatic errors is arranged between the positive achromates 16. The result is that, downstream from the beam expansion system 4, the focal planes belonging to different wavelengths match each other much more closely than in the case shown in FIG. 2a, where there is no pulse stretcher 3.

Regarding additional advantageous embodiments of the optical arrangement according to the invention, in order to avoid repetitions, reference is hereby made to the general part of the description.

Finally, it should be explicitly pointed out that the embodiments described above serve merely to explain the claimed teaching, but that said teaching is not limited to those embodiments.

What is claimed is:

1. An optical arrangement comprising:
a laser configured to emit a beam for illuminating a specimen;
a chromatic error correcting device disposed in a beam path of the beam, the chromatic error correcting device including a pulse stretcher configured to provide a stretched beam downstream of the chromatic error detecting system such that the stretched beam illuminates the specimen; and
a beam expansion system;
wherein the pulse stretcher is integrated into the beam expansion system.

2. The optical arrangement as recited in claim 1 wherein the laser includes a short-pulse laser.

3. The optical arrangement as recited in claim 1 wherein the pulse stretcher is disposed in a non-collimated section of the beam path.

4. The optical arrangement as recited in claim 1 further comprising a first and a second positive achromate having the same properties.

5. The optical arrangement as recited in claim 1 wherein the pulse stretcher includes glass.

6. The optical arrangement as recited in claim 5 wherein the glass includes a glass rod.

7. The optical arrangement as recited in claim 3 wherein the short-pulse laser includes a titanium-sapphire laser.

8. The optical arrangement as recited in claim 1 further comprising a multi-photon laser microscope.

9. A scanning microscope comprising:
a laser configured to emit a beam for illuminating a specimen;
a chromatic error correcting device disposed in a beam path of the beam, the chromatic error correcting device including a pulse stretcher configured to provide a stretched beam downstream of the chromatic error detecting system such that the stretched beam illuminates the specimen; and
a beam expansion system,
wherein:
the pulse stretcher is disposed in an area of the beam expansion system,
the beam expansion system includes a first and a second positive achromate each having a respective different, focal length; and
the pulse stretcher disposed between the positive achromates.

10. The optical arrangement as recited in claim 1 wherein: the beam expansion system includes a first and a second positive achromate each having a respective different focal length; and the pulse stretcher disposed between the positive achromates.

11. The optical arrangement as recited in claim 9 wherein the pulse stretcher is disposed in a non-collimated section of the beam path.

12. The optical arrangement as recited in claim 9 wherein the pulse stretcher includes a glass rod.

13. The optical arrangement as recited in claim 9 wherein the pulse stretcher is disposed between the first and second positive achromate.

14. A scanning microscope comprising:
a laser configured to emit a beam for illuminating a specimen;
a chromatic error correcting device disposed in a beam path of the beam, the chromatic error correcting device including a pulse stretcher configured to provide a stretched beam downstream of the chromatic error detecting system such that the stretched beam illuminates the specimen; and
a first and a second positive achromate having the same properties.

15. The optical arrangement as recited in claim 14 wherein the pulse stretcher is disposed in a non-collimated section of the beam path.

16. The optical arrangement as recited in claim 14 wherein the pulse stretcher includes a glass rod.

17. The optical arrangement as recited in claim 14 wherein the pulse stretcher is disposed between the first and second positive achromate.

* * * * *